United States Patent [19]

Srivastava et al.

[11] Patent Number: 5,312,612
[45] Date of Patent: May 17, 1994

[54] POLYMORPHOUS LUMINESCENT COMPOSITIONS

[75] Inventors: Alok M. Srivastava, Schenectady, N.Y.; John F. Ackerman, Cheyenne, Wyo.

[73] Assignee: General Electric Company, Schenectady, N.Y.

[21] Appl. No.: 949,952

[22] Filed: Sep. 24, 1992

[51] Int. Cl.$^5$ .................. C09K 11/61; C09K 11/67
[52] U.S. Cl. ........................ 423/464; 252/301.4 H
[58] Field of Search .............. 423/464; 252/301.4 H

[56] References Cited

U.S. PATENT DOCUMENTS 4,741,893  5/1988  Watanabe et al. .................. 423/464

OTHER PUBLICATIONS

Lipeng et al. "J. of Non-Crystalline Solids" 140 (1992) pp. 220–224.
Levchishina et al. "Chem. Abstracts", vol. 88, 1978, 57754v.

Primary Examiner—Jack Cooper
Attorney, Agent, or Firm—William H. Pittman

[57] ABSTRACT

Polymorphous phosphorescent compounds of the formula $MNbOF_5$, wherein M is at least one of barium, strontium, lead and calcium, are prepared by the reaction of the appropriate metal oxide or fluoride with niobium(V) oxide in aqueous hydrofluoric acid.

5 Claims, No Drawings

POLYMORPHOUS LUMINESCENT COMPOSITIONS

This invention relates to new luminescent compositions of matter, useful as phosphors.

Phosphors are employed in such diverse applications as fluorescent lamps, television receivers, X-ray detection devices including computerized tomography scanners, digital radiography devices and positron emission tomography apparatus. Upon excitation by ultraviolet, X-ray or cathode radiation, they release energy in the form of light which may be easily detected.

For many areas of phosphor utilization including medical imaging systems, it is desired to have materials with short primary decay times. One way of reducing decay time is to formulate phosphors having no electrons in the d orbitals of the ground state. Various materials having this property are known. However, there is a continuing search for new phosphor materials with potential for utilization in systems of this type.

A number of phosphors satisfying these criteria are provided by the present invention. They are characterized by a polymorphous structure. That is, they exist in one crystalline form upon preparation, and are converted to another crystalline form when heated as described hereinafter. Both forms are luminescent.

In one of its aspects, the invention includes compounds having the formula $MNbOF_5$, wherein M is at least one of barium, strontium, lead and calcium.

As will be apparent from the above generic formula, the compositions of this invention are oxyfluorides in which the cationic species is a divalent ion selected from the group consisting of barium, strontium, lead and calcium. They may be prepared by the reaction of at least one oxide or fluoride having the formula MO or $MF_2$ with niobium(V) oxide in aqueous hydrofluoric acid solution, at temperatures up to about 125° C.

As formed, said compounds have a cubic crystal lattice. Upon heating to their melting points in an inert atmosphere such as nitrogen, they are converted to materials of identical stoichiometry having a hexagonal crystal structure. In the hexagonal form, they have luminescent properties identical to those of the cubic materials prepared at lower temperatures.

The preparation of the compounds of this invention is illustrated by the following examples.

EXAMPLE 1

Niobium pentoxide, 0.5 mole, and barium fluoride, 1 mole, were dissolved in an excess of 25% (by weight) aqueous hydrofluoric acid solution and the mixture was evaporated to dryness, with stirring. The solid residue was treated twice more with hydrofluoric acid solution in the same way. The product was the desired $BaNbOF_5$, which luminesced intensely when exposed to ultraviolet light at a wavelength of 265 nm. The product had a cubic crystal lattice with the following X-ray diffraction pattern at room temperature:

| d | hkl | $I/I_{max} \times 100\%$ |
| --- | --- | --- |
| 6.5102 | 100 | 1.8 |
| 4.8224 | 101 | 11.2 |
| 3.6973 | 110 | 100.0 |
| 3.1950 | 200 | 69.3 |
| 2.9472 | 201 | 5.9 |
| 2.4216 | 210 | 29.8 |
| 2.3102 | 103 | 1.2 |
| 2.1423 | 300 | 20.9 |
| 2.0301 | 212 | 58.2 |
| 1.8574 | 302 | 21.8 |
| 1.7763 | 310 | 8.8 |
| 1.7354 | 213 | 2.8 |
| 1.6053 | 312 | 16.8 |
| 1.4732 | 402 | 25.1 |
| 1.4058 | 304 | 14.3 |
| 1.3730 | 411 | 11.1 |
| 1.2852 | 314 | 8.6 |
| 1.2408 | 006 | 7.0 |
| 1.2156 | 404 | 7.0 |
| 1.1712 | 332 | 5.8 |
| 1.1563 | 206 | 7.4 |
| 1.1054 | 333 | 3.9 |

Upon heating to 850° C. in a sealed platinum tube and cooling, the product was converted to one having a hexagonal crystal lattice and the following X-ray diffraction pattern at room temperature:

| d | hkl |
| --- | --- |
| 6.5102 | 100 |
| 4.8224 | 101 |
| 3.6973 | 110 |
| 3.1950 | 102 |
| 3.1950 | 200 |
| 2.9472 | 201 |
| 2.4216 | 202 |
| 2.3102 | 103 |
| 2.1423 | 300 |
| 2.0765 | 301 |
| 2.0301 | 212 |
| 1.8574 | 220 |
| 1.7763 | 104 |
| 1.7354 | 213 |
| 1.6053 | 400 |
| 1.4732 | 320 |
| 1.4058 | 410 |
| 1.3730 | 411 |
| 1.2852 | 500 |
| 1.2408 | 006 |
| 1.2408 | 330 |
| 1.2156 | 420 |
| 1.1712 | 332 |
| 1.1563 | 422 |
| 1.1054 | 512 |

EXAMPLE 2

The procedure of Example 1 was repeated, substituting strontium oxide for the barium fluoride. A similar product having similar properties was obtained.

EXAMPLE 3

The procedure of Example 1 is repeated, substituting calcium oxide for the barium fluoride. A similar product having similar properties is obtained.

EXAMPLE 4

The procedure of Example 1 was repeated, substituting a mixture of 1 mole percent lead(II) oxide and 99 mole percent barium oxide for the barium fluoride. A similar product having similar properties was obtained.

The compounds of this invention, being luminescent, are useful are phosphors in numerous types of lighting structures, medical diagnostic structures and the like, including those enumerated hereinabove. Accordingly, another aspect of the present invention is a phosphorescent article comprising a compound of this invention deposited on a substantially chemically inert support.

Said support may be, for example, a material which is also inert to radiation (i.e., a glass envelope in the case of a fluorescent lamp fixture). In the case of a medical imaging apparatus, it may be a light sensing unit such as a photodiode, photomultiplier device or charge-coupled device.

What is claimed is:

1. A luminescent crystalline compound having the formula $MNbOF_5$, wherein M is at least one of strontium and lead.
2. A compound according to claim 1 wherein M is strontium.
3. A compound according to claim 1 wherein M is lead.
4. A compound according to claim 1 which has a cubic crystal structure.
5. A compound according to claim 1 which has a hexagonal crystal structure.

* * * * *